(12) United States Patent
Suh

(10) Patent No.: US 11,109,206 B2
(45) Date of Patent: Aug. 31, 2021

(54) SECURITY METHOD AND SYSTEM FOR SUPPORTING DISCOVERY AND COMMUNICATION BETWEEN PROXIMITY BASED SERVICE TERMINALS IN MOBILE COMMUNICATION SYSTEM ENVIRONMENT

(71) Applicant: Samsung Electronics Co., Ltd, Gyeonggi-do (KR)

(72) Inventor: Kyungjoo Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 454 days.

(21) Appl. No.: 15/034,537

(22) PCT Filed: Nov. 4, 2014

(86) PCT No.: PCT/KR2014/010533
§ 371 (c)(1),
(2) Date: May 4, 2016

(87) PCT Pub. No.: WO2015/065165
PCT Pub. Date: May 7, 2015

(65) Prior Publication Data
US 2016/0262019 A1 Sep. 8, 2016

(30) Foreign Application Priority Data
Nov. 4, 2013 (KR) .................. 10-2013-0133171

(51) Int. Cl.
*H04W 12/06* (2021.01)
*H04L 9/32* (2006.01)
(Continued)

(52) U.S. Cl.
CPC ............. *H04W 4/70* (2018.02); *H04L 9/3271* (2013.01); *H04L 9/3297* (2013.01);
(Continued)

(58) Field of Classification Search
CPC ....... H04W 12/06; H04W 8/005; H04W 4/70; H04L 63/08; H04L 63/0823;
(Continued)

(56) References Cited

U.S. PATENT DOCUMENTS 8,260,261 B2 * 9/2012 Teague .................. H04L 9/3273
455/410
8,787,247 B2 * 7/2014 Toskala .................. H04W 76/14
370/322

(Continued)

FOREIGN PATENT DOCUMENTS

KR 10-2013-0063694 6/2013
WO WO 2013/039528 A1 3/2013

(Continued)

OTHER PUBLICATIONS

International Search Report dated Jan. 19, 2015 in connection with International Patent Application No. PCT/KR2014/010533, 5 pages.

(Continued)

*Primary Examiner* — Zachary A. Davis

(57) ABSTRACT

A device-to-device (hereinafter referred to as "D2D") discovery for D2D communication and a related security method during the D2D communication are provided when a proximity based service (hereinafter referred to as "ProSe"), ProSe discovery, ProSe communication, and the D2D communication are performed in a mobile communication network, and thus a device for performing communication is capable of carrying out a security method for the ProSe discovery and the ProSe communication.

10 Claims, 8 Drawing Sheets

(51) Int. Cl.
  *H04W 4/70* (2018.01)
  *H04W 8/00* (2009.01)
  *H04W 76/14* (2018.01)
  *H04W 12/041* (2021.01)
  *H04W 12/069* (2021.01)

(52) U.S. Cl.
  CPC ......... *H04W 8/005* (2013.01); *H04W 12/041* (2021.01); *H04W 12/06* (2013.01); *H04W 12/069* (2021.01); *H04W 76/14* (2018.02)

(58) Field of Classification Search
  CPC ............... H04L 63/0876; H04L 63/083; H04L 63/0838; H04L 9/3271; H04L 9/3297; H04L 9/3226; H04L 9/3228
  See application file for complete search history.

(56) References Cited

U.S. PATENT DOCUMENTS

| | | | | |
|---|---|---|---|---|
| 8,811,989 B2 * | 8/2014 | Park | ...................... | H04W 68/02 455/435.1 |
| 9,288,794 B2 * | 3/2016 | Beale | .................. | H04W 72/042 |
| 9,397,839 B2 * | 7/2016 | Thoniel | ............... | H04L 63/0823 |
| 2011/0271334 A1 * | 11/2011 | Yang | ..................... | H04L 63/083 726/7 |
| 2013/0015953 A1 * | 1/2013 | Hsu | ......................... | H04W 4/08 340/7.46 |
| 2013/0065526 A1 | 3/2013 | Pottier et al. | | |
| 2013/0148526 A1 | 6/2013 | Hwang et al. | | |
| 2014/0335791 A1 | 11/2014 | Kim et al. | | |
| 2015/0087233 A1 | 3/2015 | Kim et al. | | |
| 2015/0304851 A1 * | 10/2015 | Chen | ...................... | H04W 4/80 713/172 |
| 2016/0065362 A1 * | 3/2016 | Choyi | .................. | H04L 63/065 380/279 |

FOREIGN PATENT DOCUMENTS

| WO | WO 2013/089452 A1 | 6/2013 |
|---|---|---|
| WO | WO 2013/095001 A1 | 6/2013 |

OTHER PUBLICATIONS

Written Opinion of the International Searching Authority dated Jan. 19, 2015 in connection with International Patent Application No. PCT/KR2014/010533, 5 pages.

* cited by examiner

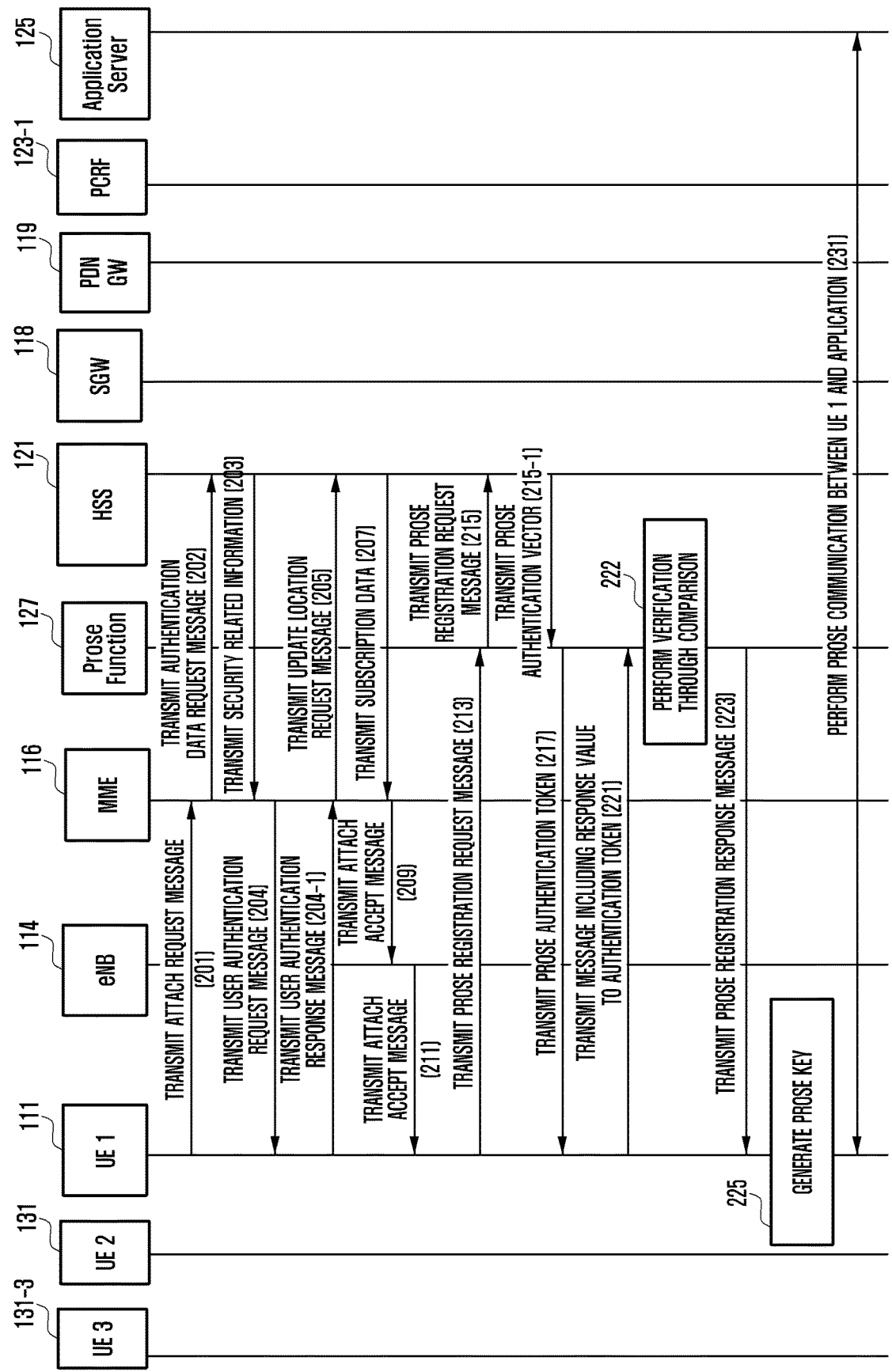

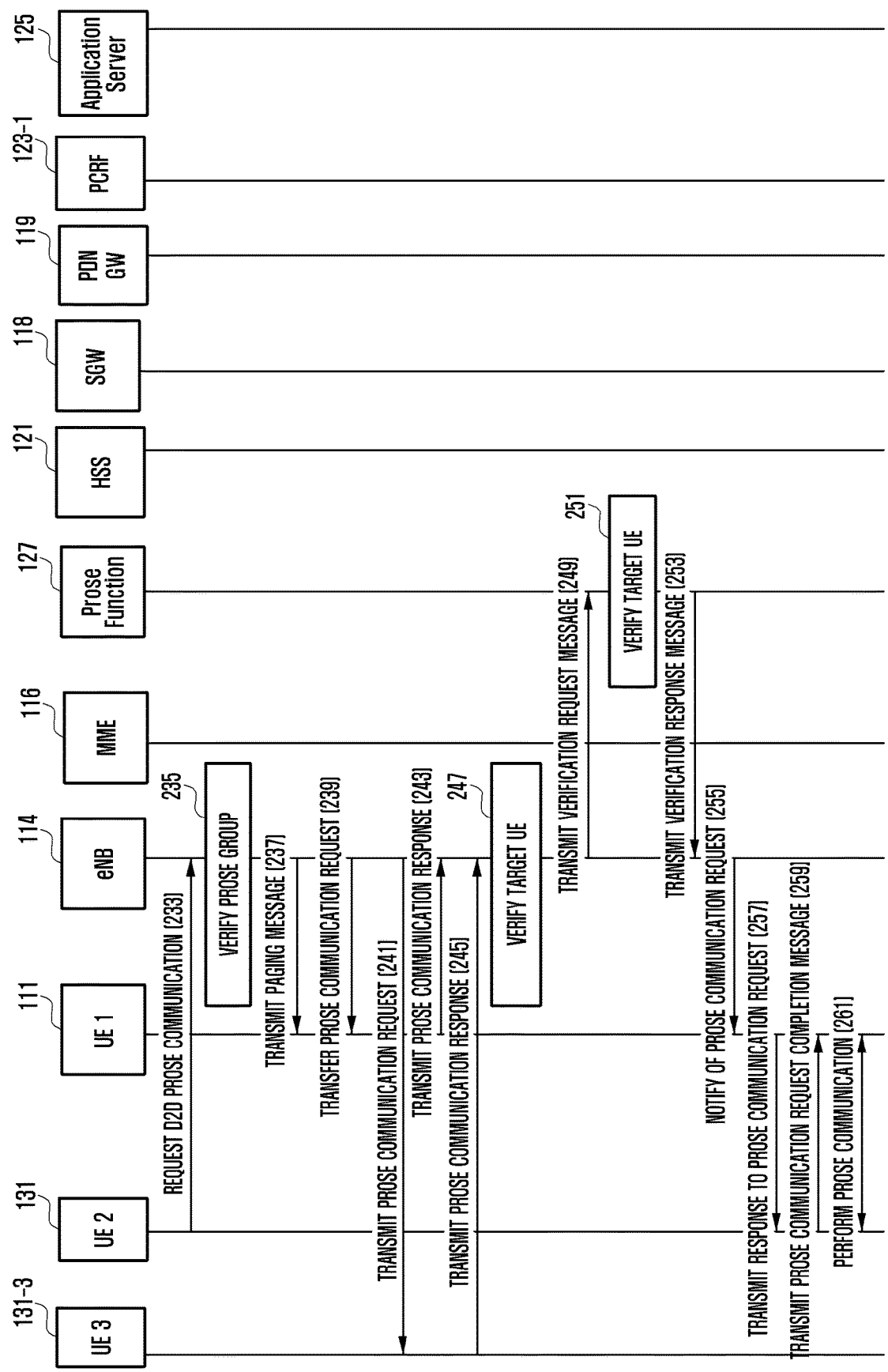

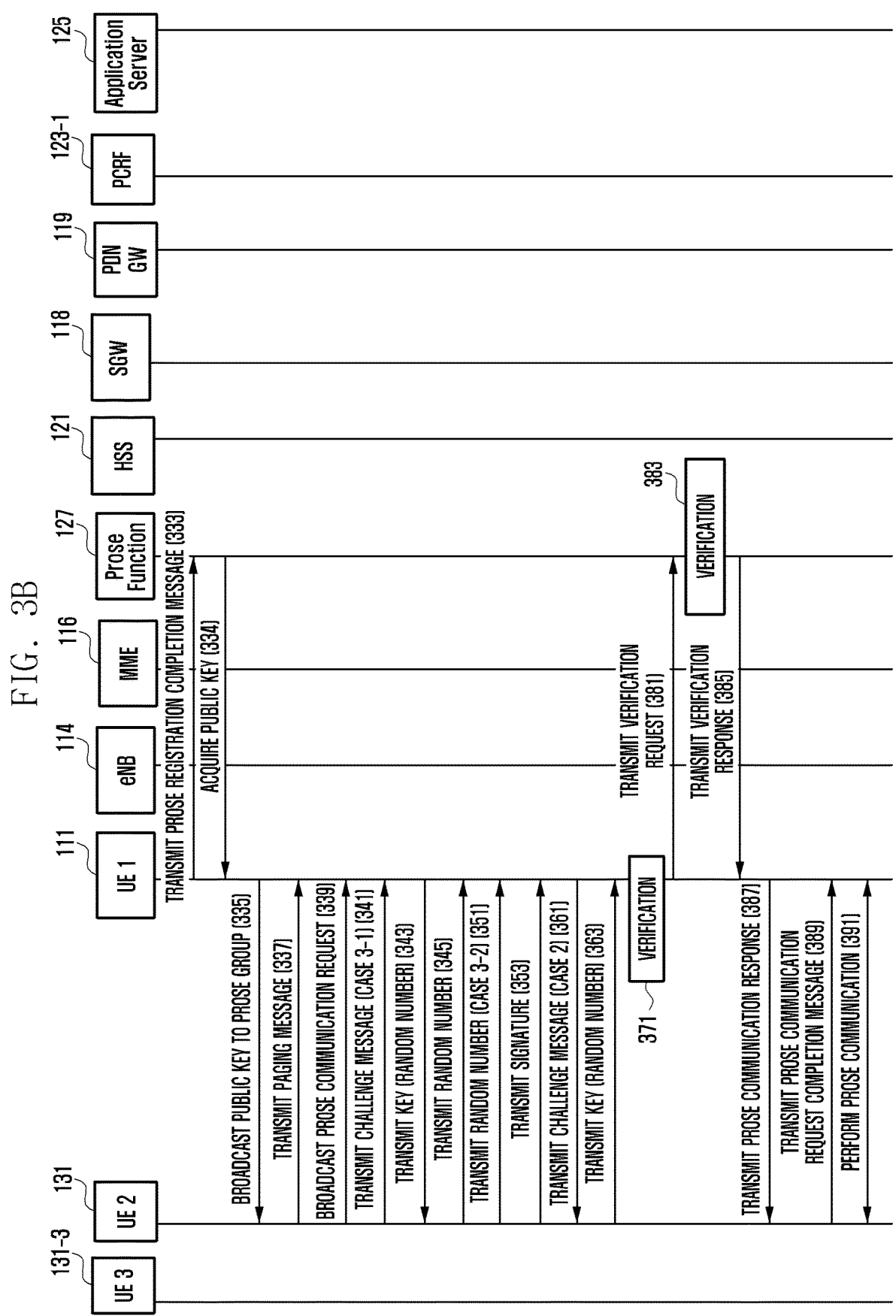

SECURITY METHOD AND SYSTEM FOR SUPPORTING DISCOVERY AND COMMUNICATION BETWEEN PROXIMITY BASED SERVICE TERMINALS IN MOBILE COMMUNICATION SYSTEM ENVIRONMENT

FIELD OF THE INVENTION

The present invention relates to a method that makes it possible to perform device-to-device communication in an evolved mobile communication system including a 3GPP Evolved Packet System (EPS) and a method for setting and managing security in the device-to-device communication.

BACKGROUND

The present invention relates to a system that enables a device to perform a communication function, and in this case, the device may include various devices, such as mobile communication terminals in the related art, devices that perform Machine Type Communication (hereinafter referred to as "MTC"), and consumer devices.

The present invention relates to a proximity based service (hereinafter referred to as "ProSe"), that is, ProSe discovery and ProSe communication, in performing device-to-device communication. In particular, the present invention relates to a method and a system that make it possible to perform safe communication in security through application of schemes for related information and security setting so as to make it possible to perform communication between ProSe terminals.

Currently, in performing device-to-device communication in a communication system structure in the related art, there is not enough discussion on systems and methods for security setting and management for device-to-device communication due to vulnerability according to security exposure of terminal related information and other operational difficulties, and thus the current device-to-device communication may cause problems of security vulnerability or inefficiency in performing the communication.

SUMMARY OF THE DISCLOSURE

Technical Problem

A device that intends to perform device-to-device (hereinafter referred to as "D2D") communication through the present invention can perform safe communication by acquiring information for performing the D2D communication, acquiring a security key for performing the D2D communication, and setting security for performing the D2D communication.

Solution to Problem

In one aspect of the present invention, a security method includes: transmitting a proximity based service (ProSe) registration request message to a ProSe function node; receiving a ProSe authentication token from the ProSe function node; transmitting a message that includes a response value to the received authentication token to the ProSe function node; receiving a ProSe registration response message that includes an integrity key and an encryption key seed for communication between a terminal and an application server; and generating a ProSe key for performing communication with the application server in response to the ProSe registration response message.

In another aspect of the present invention, an apparatus includes: a transceiver unit configured to perform communication with at least one node of a mobile communication network; and a control unit configured to transmit a proximity based service (ProSe) registration request message to a ProSe function node, to receive a Pro Se authentication token from the ProSe function node, to transmit a message that includes a response value to the received authentication token to the ProSe function node, to receive a ProSe registration response message that includes an integrity key and an encryption key seed for communication between a terminal and an application server, and to generate a ProSe key for performing communication with the application server in response to the ProSe registration response message.

In still another aspect of the present invention, a communication support method of a proximity based service (ProSe) function node in a mobile communication system includes: receiving a Device-to-Device (D2D) communication authentication request for a first terminal; determining whether the first terminal is a D2D communication target terminal in accordance with the authentication request; and transmitting an authentication response in accordance with the result of the determination.

In still another aspect of the present invention, a proximity based service (ProSe) function node in a mobile communication system includes: a communication unit configured to transmit and receive signals; and a control unit configured to receive a Device-to-Device (D2D) communication authentication request for a first terminal, to determine whether the first terminal is a D2D communication target terminal in accordance with the authentication request, and to transmit an authentication response in accordance with the result of the determination.

In still another aspect of the present invention, a Device-to-Device (D2D) communication method of a terminal in a mobile communication system includes: receiving a D2D communication request from a first terminal; determining whether the terminal is a target terminal for the D2D communication request from the first terminal; transmitting a D2D communication request response message to the first terminal in accordance with the result of the determination; and performing D2D communication with the first terminal.

In still another aspect of the present invention, in a Device-to-Device (D2D) communication method of a terminal in a mobile communication system, the terminal includes: a communication unit configured to transmit and receive signals; and a control unit configured to receive a D2D communication request from a first terminal, to determine whether the terminal is a target terminal for the D2D communication request from the first terminal, to transmit a D2D communication request response message to the first terminal in accordance with the result of the determination, and to perform D2D communication with the first terminal.

Advantageous Effects of Invention

In accordance with the present invention, a device can provide or receive information between terminals or by the assistance of a network in an environment, such as an Evolved Universal Terrestrial Radio Access Network (hereinafter referred to as "EUTRAN"), or a Universal Terrestrial Radio Access Network (hereinafter referred to as "UTRAN")/GSM/EDGE Radio Access Network (hereinafter referred to as "GERAN"). Further, since the device receives security key related information for setting ProSe related security for ProSe discovery and ProSe communication and performs a security procedure using the security key, communication efficiency and security can be enhanced in the ProSe discovery and the ProSe communication.

BRIEF DESCRIPTION OF THE DRAWINGS

FIGS. 2A and 2B are message flowcharts explaining communication and security procedures for ProSe discovery and communication security between ProSe communication terminals according to an embodiment of the present invention;

FIGS. 3A and 3B are message flowcharts illustrating communication and security procedures for ProSe discovery and communication security between ProSe communication terminals according to an embodiment of the present invention;

DETAILED DESCRIPTION

Hereinafter, the operational principle according to preferred embodiments of the present invention will be described in detail with reference to the accompanying drawings. In describing the present invention, well-known functions or components incorporated herein are not described in detail since they would obscure the subject matter of the present invention in unnecessary detail. Further, all terms used in the description are defined in consideration of their functions in the present invention, but may differ depending on intentions of a user and an operator or customs. Accordingly, they should be defined on the basis of the contents of the whole description of the present disclosure.

The subject matter of the present invention to be described later is to provide a method that enables various devices that operate as User Equipment (UE) to perform safe communication by performing mutual discovery and mutual communication with each other, transferring related information, and performing a security procedure.

Hereinafter, in describing the present invention in detail, 3GPP based EPS system, Universal Terrestrial Radio Access Network (UTRAN), and GSM/EDGE Radio Access Network (GERAN) will be used. However, the present invention can also be used in other mobile systems. In an embodiment of the present invention, the term "ProSe" is one of LTE-advanced release 12 standard technologies, and may designate a proximity based service or Device-to-Device (D2D) communication technology using a cellular network. In the description of the present invention, the term "ProSe" designates the D2D communication technology, and may be used as "D2D" in replacement of the expression.

In the case where the UE performs D2D communication by receiving related information and security related information transferred thereto and performing a security procedure, various modifications may be made within a range that does not deviate from the scope of the present invention.

Figure 1:
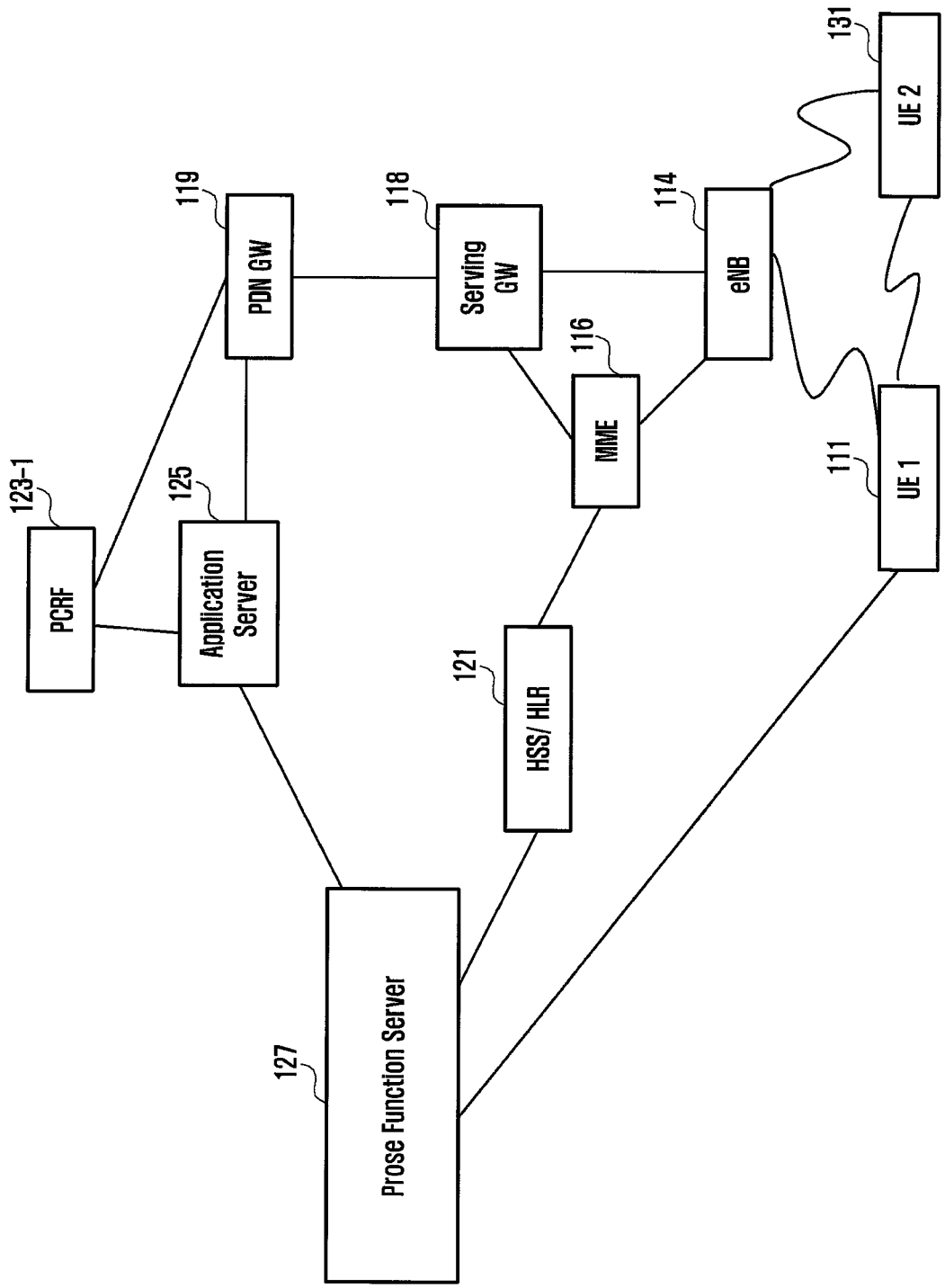
FIG. 1 is a diagram explaining a network environment according to an embodiment of the present invention.

As shown in FIG. 1, an embodiment of the present invention proposes a management method that makes it possible to transfer related information, to perform a security procedure, and to perform safe communication when various devices including a communication UE that is the basic object of the present invention intend to perform D2D communication in an EUTRAN or 3GPP environment. This method can be applied to other mobile communication systems having a similar technical background and channel type, network architecture, a similar protocol, or a different protocol that performs similar operation with slight modifications in a range that does not greatly deviate from the scope of the present invention, and this may be possible through the judgment of a person skilled in the art to which the present invention pertains.

FIG. 1 is a block diagram illustrating a network environment for security setting and ProSe communication for ProSe discovery and ProSe communication. Here, as an example, a 3GPP EPS system structure is illustrated. In the present invention, explanation will be made around the UTRAN, and this method may be used even in other similar mobile communication systems. The network of FIG. 1 is to explain an embodiment of a network, but the network to which the present invention is applied is not limited thereto. In an embodiment of the present invention, a ProSe function server may be configured to be connected to other network entities with an entity that is different from the component of FIG. 1.

Referring to FIG. 1, a device or User Equipment (UE) 111 may include various devices, such as mobile communication UE in the related art, devices that perform machine type communication, and consumer devices.

FIG. 1 illustrates an applicable environment in which UE 1 111 and UE 2 131 perform ProSe discovery and ProSe communication. The UE 1 111 may perform general EUTRAN communication through an evolved Node B (hereinafter referred to as "eNB") 114 and a Mobility Management Entity (hereinafter referred to as "MME") 116, and may perform data communication through a serving gateway 118 and a Packet Data Network (hereinafter referred to as "PDN") gateway 119. A ProSe function server 127 that performs ProSe related function exists to perform the ProSe function. The ProSe function server 127 verifies ProSe related registration, transfer of related information, and ProSe related capability of the UE, and performs ProSe related function. A Home Subscriber Server (hereinafter referred to as "HSS") 121 exists to transfer subscription information related to the UE and UE related security key information. The ProSe performs a ProSe application server function through a ProSe application server 125, and in order to perform such ProSe application, the ProSe application server 125 performs a ProSe related data service in association with a Policy and Charging Rules Function (PCRF) 123-1. The network may not include the separate application server 125. For example, the ProSe application server 125 may not be provided separately from the ProSe function server 127. For example, the ProSe function server 127 may perform the function of the application server 125.

Hereinafter, referring to FIGS. 2A to 3B, the present invention will be described with reference to the network as described above so that entities, such as the device or UE 111, the eNB, the MME, the ProSe function, the HSS, and the application server 125, can support authentication, security, and communication setting processes and operations that make it possible to perform proximity based service, ProSe discovery, and ProSe communication on the basis of protocols used in the mobile communication and Internet communication.

FIGS. 2A and 2B are message flowcharts explaining communication and security procedures for ProSe discovery and communication security between ProSe communication terminals according to an embodiment of the present invention. In the embodiment of FIGS. 2A and 2B, it is exemplified that the control for UE-to-UE ProSe discovery and ProSe communication is performed by the eNB. In the embodiment of FIGS. 2A and 2B, the function that is performed by the eNB 114 may be performed through the ProSe function 127.

In the embodiment of FIGS. 2A and 2B, a network system may include UE 111, 131, and 131-3, an eNB 114, an MME 116, a ProSe function 127, an HSS 121, a SGW 118, a PDN GW 119, a PCRF 123-1, and an application server 125. In performing the embodiment of the present invention, some of the entities may be omitted, and functions of some of the entities may be performed by other entities. The eNB may be called a base station.

Each of the entities that constitute the network of FIGS. 2A and 2B may include at least one communication unit (also referred to as a transceiver) and at least one control unit (also referred to as a controller). The communication unit of each of the entities may be used to transmit or receive signals with another network node. The control unit of each of the entities may control the overall operation of each of the entities. Further, the control unit may control the operation of each of the entities to be described hereinafter with reference to the drawings.

At operation 201, the UE 1 111 performs a registration procedure through transmission of an attach request message to the eNB 114. The attach request message that is transmitted by the UE 1 111 is transferred from the eNB 114 to the MME 116. At operation 202, the MME 116 transmits an authentication data request message to the HSS 121. At operation 203, the HSS 121 transmits security related information including an authentication vector and the like to the MME 116.

At operation 204, the MME 116 transmits a user authentication request message including an Authentication Token (AUTN) to the UE 1 111. At operation 204-1, the UE 1 111 transmits a user authentication response message to the MME 116. The user authentication response message may include a Response Security value (RES).

At operation 205, the MME 116 transmits an update location request message to the HSS 121. At operation 207, the HSS 121 transmits subscription data to the MME 116. In addition, the HSS 121 transfers information on a ProSe identity for performing a ProSe service, a ProSe group identity, a ProSe group key, a ProSe related capacity of the UE, a proximity related security key (ProSe key) if there exist registered ProSe identity and security key, and a ProSe Public Land Mobile Network (PLMN) list. The proximity related security key is a security key for proximity discovery or proximity communication. If there exists registered information, the security key inquires and notifies of the registered information, whereas if there does not exist the registered information, the security key generates the information after authentication in the subsequent operation.

At operation 209, the MME 116 transmits an attach accept message to the eNB 114. At operation 211, the attach accept message is transmitted from the eNB 114 to the UE 1 111. At operations 209 and 211, the information that is transferred from the HSS 121 at operation 207, such as the ProSe identity for performing the ProSe service, the ProSe group identity, the ProSe related capacity of the UE, the proximity related security key, the ProSe group key, the ProSe group identity, and the ProSe PLMN list, can be transferred together.

At operation 213, the UE 1 111 transmits a ProSe registration request message to the ProSe function 127. At operation 215, the ProSe function 127 transmits the ProSe registration request message to the HSS 121. Then, at operation 215-1, the HSS 121 transmits a ProSe authentication vector to the ProSe function 127. The authentication vector may include a cipher key (hereinafter referred to as "CK") and an integrity key (hereinafter referred to as "IK"). At operation 217, the ProSe function 127 transmits a ProSe authentication token to the UE 1 111.

At operation 221, the UE 1 111 transmits a message, which includes a response value XRES to the authentication token transmitted from the ProSe function 127 to the UE 1 111 for the ProSe registration, to the ProSe function 127. At operation 222, the ProSe function 127 verifies the RES and XRES information through comparison thereof with each other. At operation 223, the ProSe function 127 transmits a ProSe registration response message to the UE 1 111. In this case, an integrity key and an encryption key seed to protect the communication between the UE 1 111 and the application server 125 may be transmitted.

At operation 225, the UE 1 111 may generate a ProSe key. The ProSe key may be generated on the basis of the integrity key or the encryption key seed. At operation 231, the UE1 111 and the application server 125 may perform communication with each other. The UE 1 111 and the application server 125 may perform ProSe communication on the basis of the ProSe key and ProSe Identity (hereinafter referred to as "ID") information.

The subsequent processes are processes in which other UEs 131 and 131-3 that are different from the UE 1 111 perform communication using the ProSe key or the ProSe ID. The operation of the eNB 114 may be determined under the control of the ProSe function 127.

At operation 233, UE 2 131 transmits a D2D ProSe communication request with respect to the UE 1 111 to the eNB 114. In this case, the ProSe Identity (ID) of the UE 2 131, the ProSe ID of the UE 1 111, and a ProSe group ID may be used as identities. At operation 235, the eNB 114 verifies whether the UE 2 131 belongs to the corresponding ProSe group. In this case, the eNB 114 verifies the ProSe group with the ProSe ID of the UE 2 131, or in another embodiment, the eNB 114 verifies the ProSe group with the ProSe group ID that is transmitted by the UE 2 131 and the ProSe ID of the UE 2 131. The verification process may be performed by not only the eNB 114 but also another entity. For example, the ProSe function 127 may verify whether the UE 2 belongs to the ProSe group. The ProSe function 127 may be performed in accordance with a verification request from the eNB 114. The ProSe function 127 may transmit the result of the verification to the eNB 114 or the UE 2 131.

At operation 237, the eNB 114 transmits a paging message to the UE 1 111. In this case, the paging message may include an indication for the UE-to-UE communication. The UE 1 111 that has received the paging message can know that the purpose of the paging is to perform the UE-to-UE communication on the basis of the indication that is included in the paging message.

Then, at operation 239, the eNB 114 may transfer the ProSe communication request. The eNB 114 transfers the D2D ProSe communication request that is received from the UE 2 131 (at operation 233) to the UE 1 111. In an embodiment, in the case where the UE 2 131 knows the ProSe ID of the UE 1 111 as the destination, the eNB 114 may dedicatedly transmit the ProSe communication request to the UE 1 111 (case 1).

In another embodiment (case 2), the eNB 114 may broadcast the ProSe communication request. Like operations 239 and 241, the eNB 114 may broadcast the ProSe communication request to a plurality of UEs 111 and 131-3. Like operation 243 or 245, if a response from the UE 1 111 or the UE 3 131-3 is received, the eNB 114 can verify whether the UEs 111 and 131-3 that have transmitted the response are suitable destinations of the ProSe communication requested by the UE 2 131 based on a verification process of the response. In an embodiment (case 2), a broadcast channel may be used, whereas in another embodiment (case 3), a specific channel for the ProSe may be used. At operation 239 or 241, the ProSe request may include the ProSe ID of the UE 2 131 that is a ProSe communication requester (announcement model: I am someone or the requester is someone). In another embodiment, the ProSe request may include not only the ProSe ID of the UE 2 131 but also the ProSe ID of the UE 1 111 that is the destination.

The UE 2 131 may determine whether the received response message corresponds to the response that is transmitted by target UE of the ProSe communication that is requested by the UE 2 131 on the basis of the received response. For example, the eNB 114 that has transferred the D2D communication request of the UE 2 131 in FIGS. 2A and 2B may receive a response from the UE 1 111 or may receive responses from several UEs including the UE 1 111, and may determine whether the received response is the response from the UE 1 111 that is the ProSe communication destination of the UE 2 131. The eNB 114 may determine whether the response is the response from the UE 1 in the method below. The eNB 114 or the ProSe function 127 may pass through a verification process at operation 247 or at operations 249 to 253. In the following description, verification operations of the eNB 114 and the ProSe function 127 are dividedly explained. However, this is merely exemplary, and the verification method and the verification subject are not limited thereto. That is, the verification operation 247 may be performed by the ProSe function 127. Further, the verification operation 251 may be performed by the eNB 114.

At operation 247, the verification of the D2D communication request may be performed at the level of the eNB 114 as an embodiment. Operations 249 to 253 correspond to a case where the verification of the D2D communication request is performed at the level of the ProSe function 127 as an embodiment. According to an embodiment (case 1), the verification at operation 247 is to verify whether the target UE is the UE 1 111. That is, the UE 2 131 verifies whether the target entity that has requested the ProSe communication is the UE 1 111. This verification becomes possible through a method in which the UE 2 131 confirms whether the UE 1 111 exists in a ProSe communicable list. Further, according to another embodiment (case 2), it is determined whether the UE 1 111 and the UE 2 131 belong to the same ProSe group. This determination becomes possible by the ProSe group list or the ProSe group ID. In the above-described embodiment, the ProSe group ID may include a group identity and an individual identity.

Still another embodiment 2-2 (case 2-2) is composed of operations 249 to 253. That is, at operation 249, the eNB 114 transmits a verification request to the ProSe function 127. Then, at operation 251, the ProSe function 127 verifies a ProSe communication target UE. For example, the ProSe function 127 verifies a ProSe communication list. The ProSe communication list is a list of UEs that belong to the ProSe group that can perform ProSe communication with the UE 2 131. At operation 253, the ProSe function 127 transfers a response to the verification to the eNB 114. In this case, only whether the verification has succeeded may be simply transferred. In still another embodiment, the ProSe function 127 may transmit information on possible lists to the eNB 114. In this case, such lists may be used when the eNB 114 searches for a target UE and transmits the communication request to the target UE as a substitute for the UE 2 131.

According to still another embodiment 3 (case 3), at operation 251, the ProSe function 127 may generate a ProSe UE-to-UE key (here, between the UE 1 and the UE 2) with respect to the ProSe function verification request that is transmitted at operation 249. In this case, generation of the ProSe UE-to-UE key may be expressed in equation 1 as follows.

$$\text{ProSe UE-to-UE key} = \text{KDF (ProSe group key, ProSe UE 1 ID, ProSe UE 2 ID, RAND, ProSe server ID)} \quad \text{[Equation 1]}$$

Here, a ProSe group key may be used as the above-described key.

RAND denotes a random number, and ProSe server ID denotes an identity of a ProSe server. The ProSe UE 1 ID, the ProSe UE 2 ID, the RAND, and the ProSe server ID may be concatenated to be used.

KDF denotes a key derivation function, and may be, for example, HMAC-SHA256.

Thereafter, at operation 255, the eNB 114 notifies the UE 1 111 of the existence of the ProSe communication request from the UE 2 131. Further, the eNB 114 may notify the UE 1 111 of an address of the UE 2 131. At operation 257, the UE 1 111 may transmit a response to the ProSe communication request of the UE 2 131. At operation 259, the UE 2 131 may transmit a ProSe communication request completion to the UE 1 111. In still another embodiment, operation 259 in the latter part of operation 255 may be omitted. Thereafter, at operation 261, the UE 1 111 and the UE 2 131 may perform UE-to-UE ProSe communication.

Figure 3A:
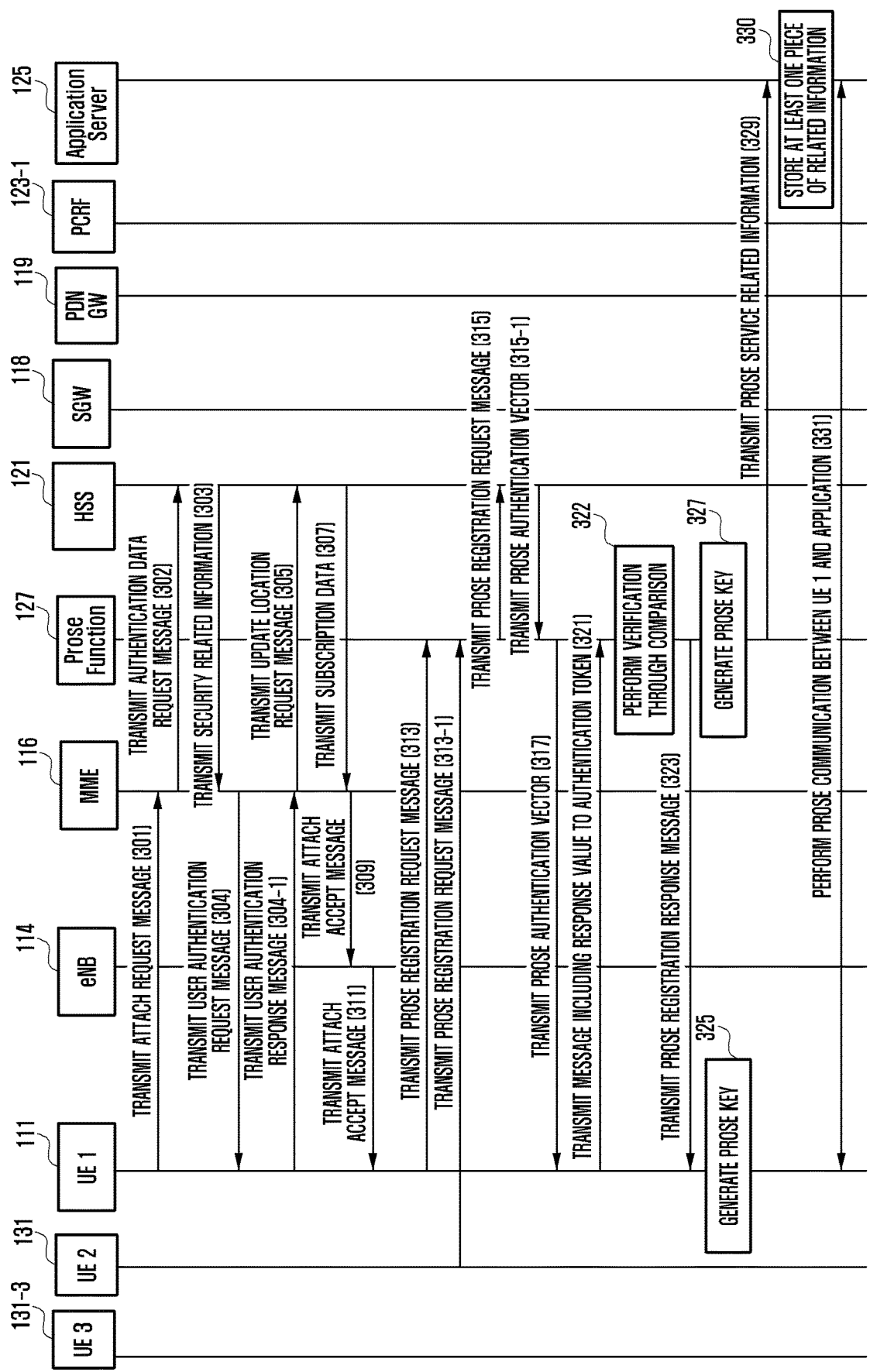

FIGS. 3A and 3B are message flowcharts explaining communication and security procedures for ProSe discovery and communication security between ProSe communication terminals according to an embodiment of the present invention. In the embodiment of FIGS. 3A and 3B, it is exemplified that the control for UE-to-UE ProSe discovery and ProSe communication is performed by the UE. In the embodiment of FIGS. 3A and 3B, the function that is performed by the eNB 114 may be performed through the ProSe function 127.

In the embodiment of FIGS. 3A and 3B, a network system may include UE 111, 131, and 131-3, an eNB 114, an MME 116, a ProSe function 127, an HSS 121, a SGW 118, a PDN GW 119, a PCRF 123-1, and an application server 125. In performing the embodiment of the present invention, some of the entities may be omitted, and functions of some of the entities may be performed by other entities. The eNB may be called a base station. Each of the entities that constitute the network of FIGS. 3A and 3B may include at least one communication unit and at least one control unit. The communication unit of each of the entities may be used to transmit or receive signals with another network node. The control unit of each of the entities may control the overall operation of each of the entities. Further, the control unit may control the operation of each of the entities to be described hereinafter with reference to the drawings.

At operation 301, the UE 1 111 performs a registration procedure through transmission of an attach request message to the eNB 114. The attach request message that is transmitted by the UE 1 111 is transferred from the eNB to the MME. At operation 302, the MME 116 transmits an authentication data request message to the HSS 121. At operation 303, the HSS 121 transmits security related information including an authentication vector and the like to the MME 116.

At operation 304, the MME 116 transmits a user authentication request message including an Authentication Token (AUTN) to the UE 1 111. At operation 304-1, the UE 1 111 transmits a user authentication response message to the MME 116. The user authentication response message may include a Response Security value (RES).

At operation 305, the MME 116 transmits an update location request message to the HSS 121. At operation 307, the HSS 121 transmits subscription data to the MME 116. In addition, the HSS 121 transfers information on a ProSe identity for performing a ProSe service, a ProSe group identity, a ProSe group key, a ProSe related capacity of the UE, a proximity related security key (ProSe key) if there exist registered ProSe identity and security key, and a ProSe Public Land Mobile Network (PLMN) list. The proximity related security key is a security key for proximity discovery or proximity communication. If there exists registered information, the HSS 121 notifies the MME 116 of the security key of the registered information, whereas if there does not exist the registered information, the MME 116 generates the security key based on the information after authentication in the subsequent operation.

At operation 309, the MME 116 transmits an attach accept message to the eNB 114. At operation 311, the attach accept message is transmitted from the eNB 114 to the UE 1 111. At operations 309 and 311, the information that is transferred from the HSS 121 at operation 307, such as the ProSe identity for performing the ProSe service, the ProSe group identity, the ProSe related capacity of the UE, the proximity related security key, the ProSe group key, the ProSe group identity, and the ProSe PLMN list, can be transferred together.

At operation 313, the UE 1 111 transmits a ProSe registration request message to the ProSe function 127. In this process, a public key of the UE 1 111 may be transmitted to the ProSe function 127 in order for the UE 1 111 to perform communication with another UE later. The transmitted public key of the UE 1 111 is stored in the ProSe function 127. For this process, the UE 1 111 may receive its own public key from a key authentication center to transmit the public key, or the ProSe function 127 may receive the public key of the UE 1 111 from the key authentication center in accordance with a request message of the UE 1 111 to store the public key therein. If the public key of the UE 1 is acquired by the ProSe function 127 in this process, operation 333 to be described later may be omitted.

At operation 313-1, like the UE 1 111, the UE 2 131 performs a ProSe registration request process. The subsequent process will be described around the UE 1 111, but it is assumed that the UE 2 131 passes through the registration process that is basically the same as the registration process of the UE 1 111. At operation 315, the ProSe function 127 transmits the ProSe registration request message to the HSS 121. Then, at operation 315-1, the HSS 121 transmits a ProSe authentication vector to the ProSe function 127. The authentication vector includes a cipher key (hereinafter referred to as "CK") and an integrity key (hereinafter referred to as "IK"). At operation 317, the ProSe function 127 transmits a ProSe authentication token to the UE 1 111. The same operation as the operation of the ProSe function 127 may be performed even with respect to the UE 2 131.

At operation 321, the UE 1 111 transmits a message, which includes a response value XRES to the authentication token transmitted from the ProSe function 127 to the UE 1 111 for the ProSe registration, to the ProSe function 127. At operation 322, the ProSe function 127 verifies the RES and XRES information through comparison thereof with each other. At operation 323, the ProSe function 127 transmits a ProSe registration response message to the UE 1 111. In this case, an integrity key and an encryption key seed to protect the communication between the UE 1 111 and the application server 125 may be transmitted.

At operation 325, the UE 1 111 may generate a ProSe key for performing the ProSe communication. The ProSe key may be used to perform communication between the UE 1 111 and the application server 125. The ProSe key may be generated from the IK and the CK or using Key Access Security Management Entries (KASME). At operation 327, the ProSe function 127 may generate the ProSe key from the IK and the CK or from the KASME. In the case of generating the ProSe key from the IK and the CK, values transferred from the HSS 121 may be used, whereas in the case of generating the ProSe key from the KASME, the MME 116 may provide the KASME, or the ProSe function 127 can generate the ProSe key through a structure in which the ProSe function 127 is combined with the MME 116.

At operation 329, the ProSe function 127 transfers the ProSe key and related information registered by the UE 1 111 for the ProSe service in the registration process to the application server 125. Further, seed information for the integrity key and the encryption key may also be transferred. At operation 330, at least one piece of information, such as the ProSe key, the integrity key seed, and the encryption key seed, may be stored. Thereafter, at operation 331, the UE 1 111 and the application server 125 perform communication using the ProSe key and the ProSe identity. The above-described process may be performed in the same manner even with respect to other UEs for using the ProSe service.

The subsequent processes are processes in which other UEs 131 and 131-3 that are different from the UE 1 111 perform communication using the ProSe key or the ProSe Identity (ID).

Thereafter, in the case where the UE 2 131 intends to verify the request that is transmitted for the ProSe communication through the public key as in case 3 at operation 371, like operation 333, the UE 1 111 registers the public key of the UE 1 in the ProSe function 127 while transmitting a ProSe registration completion message to the ProSe function 127. In the case where other UEs intend to use the public key for the verification, they may register the public key of the corresponding UE in the ProSe function 127. In this process, the UE 1 111 may transmit the public key of the UE 1 111 to the ProSe function 127 for subsequent communication with other UEs 131 and 131-3. The transmitted public key of the UE is stored in the ProSe function 127. For this process, the UE 1 111 may receive its own public key from the key authentication center to transmit the public key, or the ProSe function 127 may receive the public key of the UE 1 111 from the key authentication center in accordance with the request message of the UE 1 111 to store the public key therein. If the public key of the UE 1 is registered at operation 313 that is the ProSe registration operation as described above, the operation (operation 333) may be omitted.

In the description of the present invention, the UE 1 111 is exemplified at operation 333. However, the UE 2 131 also registers the public key of the UE 2 131 in the case of the verification using the public key. As still another embodiment, like operation 333 or 313, the public keys of UEs that have registered their own public keys in the ProSe function 127 for the communication may be used when the UE that intends to communicate with such UEs receives and verifies the public key of the UE that intends to perform communication or to obtain information through the reception method like operation 313 or 334. That is, by receiving the public key of the UE that intends to obtain the information or to perform communication at operation 334, the public key may be used to receive and verify the message of the corresponding UE thereafter.

Like operation 335, the UE 1 111 (or the UE 2 in the case of the verification using the public key of the UE 2) may notify the ProSe group of the public key. As such a notification method, broadcast may be used.

At operation 337, the UE 2 131 transmits a paging message. In this case, the paging message may include an indication for the UE-to-UE ProSe communication. The UE 1 111 that has received the paging message can know that the purpose of the paging is to perform the UE-to-UE communication on the basis of the indication.

According to another embodiment, like operation 335 or 337, the method for notifying the ProSe group of the public key or the paging method may be omitted.

At operation 339, the UE 2 131 notifies other UEs that the UE 2 131 wants to communicate with other UEs, and such request may be performed through a method using a broadcast or broadcast IP.

In the case of receiving the ProSe communication request, the UE, the eNB 114, or the ProSe function 127, which has received the ProSe communication request, may determine whether the UE that has received the ProSe communication request is a ProSe communication target terminal. In the following description, verification operations of the UE 1 111 and the ProSe function 127 are dividedly explained. However, this is merely exemplary, and the verification method and the verification subject are not limited thereto.

Since it is required to determine whether the UE 1 is a target ProSe node, the UE 1 111 that has received the ProSe communication request from the UE 2 131 passes through verification processes at operation 371 or at operations 381 to 383. At operation 371, the verification of the D2D communication request is performed at the level of the UE as an embodiment. Operations 381 to 385 correspond to a case where the verification of the D2D communication request is performed at the level of the ProSe function 127. According to an embodiment (case 1), the verification at operation 371 is to verify whether the target UE is the UE 2 131. That is, the UE 1 111 verifies whether the target ProSe ID that has requested for the ProSe communication is the UE 2 131. This verification becomes possible through a method in which the UE 1 111 confirms whether the UE 2 131 exists in a ProSe communicable list.

According to another embodiment (case 2) at operation 371, the verification is performed using a preshared key. In detail, the verification corresponds to a series of processes of 337→339→361→363→371→387. In this case, operation 337 may be omitted. At operation 361 after operation 339, the UE 1 111 transmits a challenge that includes a random number or a time stamp to the UE 2 131. At operation 363, the UE 2 131 encrypts and transmits a random value using the preshared key, and at operation 371, the UE 1 111 decrypts the encrypted random value to verify the value. In this case, a value that is used in an application may be used as the time stamp value. In still another embodiment, a value that is used in a radio frame is used as the time stamp value. Accordingly, reception and transmission can be synchronized using a more accurate time stamp, and thus security can be further enhanced.

According to still another embodiment (case 3) at operation 371, the verification is performed using a public key. In detail, case 3-1 corresponds to a verification method using a public key, and includes a series of processes of 333→334→335→337→339→341→343→345→371→387. In this case, operations 335 and 337 may be omitted. That is, operation 335 corresponds to an embodiment that is different from a case where the public key is transmitted in the form of operation 334, and unless the public key of an opposite party is pre-acquired through the broadcast or the like, there exists a process of receiving the public key of an opposite node like operation 334.

At operation 341, the UE 2 131 transmits a challenge message to the UE 1 111. At operation 343, the UE 1 111 transmits a random number or a time stamp that is encrypted with the public key of the UE 2 131 to the UE 2 131. In this case, a value that is used in an application may be used as the time stamp value. In still another embodiment, a value that is used in a radio frame is used as the time stamp value. Accordingly, reception and transmission can be synchronized using a more accurate time stamp, and thus security can be further enhanced.

Like operation 345, the UE 2 131 decrypts the random number or the time stamp with a private key of the UE 2 131 and transmits the decrypted random number of time stamp to the UE 1 111. Through this, the verification is completed. In this case, a value that is used in an application may be used as the time stamp value. In still another embodiment, a value that is used in a radio frame is used as the time stamp value. Accordingly, reception and transmission can be synchronized using a more accurate time stamp, and thus security can be further enhanced.

According to still another embodiment (case 3-2), the verification is performed using a public key, and a transmitter is authenticated with a digital signature. That is, case 3-2 includes a series of processes of 333→335→337→339→351→353→371→387. In this case, operations 335 and 337 may be omitted. That is, operation 335 corresponds to an embodiment that is different from a case where the public key is transmitted in the form of operation 334, and unless the public key of an opposite party is pre-acquired through the broadcast or the like, there exists a process of receiving the public key of an opposite node like operation 334.

In the case where the UE 2 131 has a private key of the UE 2 131 and transmits the private key with a digital signature like operation 339, the UE 1 111 has already acquired the public key of the UE 2 131 at operation 334 or 335. In this case, a random number or a time stamp value may be used. In this case, a value that is used in an application may be used as the time stamp value. In still another embodiment, a value that is used in a radio frame is used as the time stamp value. Accordingly, reception and transmission can be synchronized using a more accurate time stamp, and thus security can be further enhanced. A case where operation 339 includes the verification process as described above corresponds to a still another embodiment (case 5) that is different from the other embodiment.

Accordingly, in the case where the UE 2 131 transmits a broadcast message to the UE 1 111 at operation 339, the UE 1 111 may receive the message and may authenticate the transmitter that has transmitted the message.

As still another embodiment, at operation 351, the UE 1 111 transmits a random number or a time stamp to the UE 2 131, and at operation 353, the UE 2 131 performs verification like operation 371 through signature with the private key of the UE 2 131. In this case, a value that is used in an application may be used as the time stamp value. In still another embodiment, a value that is used in a radio frame is used as the time stamp value. Accordingly, reception and transmission can be synchronized using a more accurate time stamp, and thus security can be further enhanced.

Still another embodiment 4 (case 4) is composed of operations 381 to 385. That is, at operation 381, the UE 1 111 transmits a verification request to the ProSe function 127. Then, at operation 383, the ProSe function 127 verifies a ProSe communication list. The ProSe communication list is a list of UEs that belong to the ProSe group that can perform ProSe communication with the UE 1 111. At operation 385, the ProSe function 127 transmits a response to the verification to the UE 1 111. In this case, only whether the verification has succeeded may be simply transferred.

According to still another embodiment 5 (case 5), at operation 383, the ProSe function 127 may generate a ProSe UE-to-UE key (here, between the UE 1 and the UE 2) with respect to the verification request that is transmitted to the ProSe function 127 at operation 381. In this case, generation of the ProSe UE-to-UE key may be expressed in equation 1 as follows.

ProSe UE-to-UE key=KDF (ProSe group key, ProSe UE 1 ID, ProSe UE 2 ID, RAND, ProSe server ID)     [Equation 1]

Here, a ProSe group key may be used as the above-described key.

RAND denotes a random number, and ProSe server ID denotes an identity of a ProSe server. The ProSe UE 1 ID, the ProSe UE 2 ID, the RAND, and the ProSe server ID may be concatenated to be used. KDF denotes a key derivation function, and may be, for example, HMAC-SHA256.

At operation 387, the UE 1 111 may transmit a response to the ProSe communication request of the UE 2 131 to the UE 2 131. At operation 389, the UE 2 131 may transmit a ProSe communication request completion to the UE 1 111. In an embodiment, operations 387 and 389 may be omitted. Thereafter, at operation 391, the UE 1 111 and the UE 2 131 may perform UE-to-UE ProSe communication.

Figure 4:
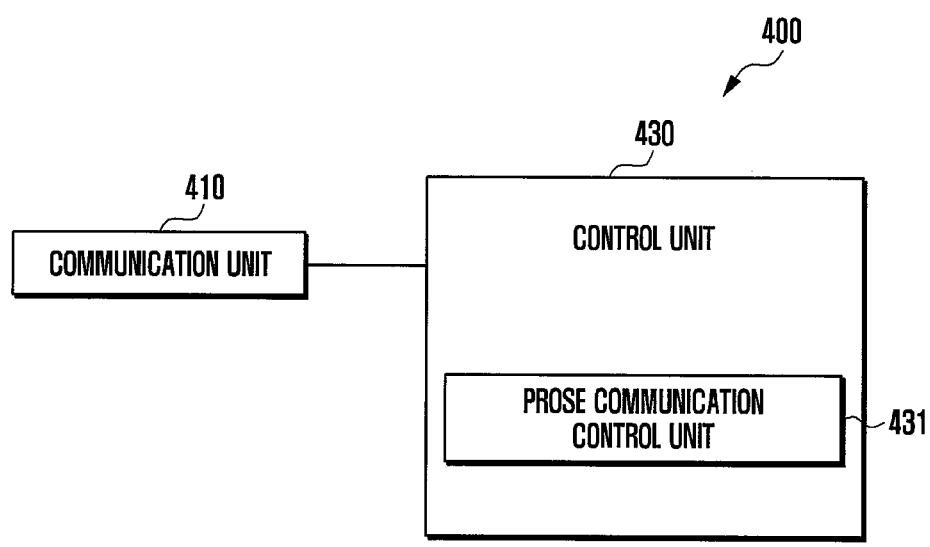
FIG. 4 is a diagram explaining a ProSe function according to an embodiment of the present invention.

FIG. 4 is a diagram explaining a ProSe function according to an embodiment of the present invention.

A ProSe function 400 may include a communication unit 410 and a control unit 430. The communication unit 410 may transmit or receive at least one signal to or from another network node. The control unit 430 may control the overall operation of the ProSe function 400. The control unit 430 may control the operation of the ProSe function 400 as described above with reference to FIGS. 1 to 3B.

Further, the control unit 430 may include a ProSe communication control unit 431.

The ProSe communication control unit 431 may receive a D2D communication authentication request for first UE, determine whether the first UE is a D2D communication target UE in accordance with the authentication request, and transmit an authentication response in accordance with the result of the determination.

Further, the ProSe communication control unit 431 may operate to perform determination on the basis of whether the first UE and second UE that has requested the D2D communication from the first UE are included in a D2D group list or D2D group identity information.

Further, the ProSe communication control unit 431 may operate to transmit at least one of authentication result information for the first UE and information on a list of UEs that can perform D2D communication as the authentication response.

Further, the ProSe communication control unit 431 may control service registration of UE that supports D2D communication, and may perform ProSe key generation and management, public key management, and secret key management.

As described above, it is explained that the component of the ProSe function 400 is divided into blocks. However, this is for convenience in explanation, and the component of the ProSe function 400 is not limited thereto.

Figure 5:
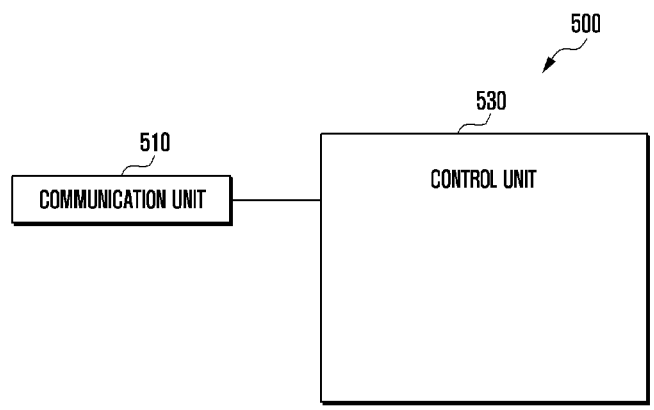
FIG. 5 is a diagram explaining a terminal according to an embodiment of the present invention.

FIG. 5 is a diagram explaining a terminal according to an embodiment of the present invention.

A terminal 500 may include a communication unit 510 and a control unit 530. The communication unit 510 may transmit or receive at least one signal to or from another network node. The control unit 530 may control the overall operation of the UE 500. The control unit 530 may control the operation of the ProSe function 400 as described above with reference to FIGS. 1 to 3B.

The control unit 530 may operate to receive a D2D communication request from the first terminal, to determine whether the UE is a target UE in accordance with the D2D communication request of the first UE, to transmit a D2D communication request response message to the first UE in accordance with the result of the determination, and to perform D2D communication with the first UE.

Further, the control unit 530 may control the UE to broadcast the public key for the D2D communication of the UE and to determine whether the UE is a D2D communication target UE on the basis of the public key information.

Further, the control unit 530 may operate to transmit an encrypted random number or time stamp to the first UE in response to the D2D request, to receive the random number or time stamp related information from the first UE, and to determine whether the UE is the target UE on the basis of the random number or time stamp related information received from the first TM.

Further, the control unit 530 may operate to transmit a verification request for the UE to a ProSe function node, and to receive a verification response from the UE.

As described above, it is explained that the component of the UE 500 is divided into blocks. However, this is for convenience in explanation, and the component of the UE 500 is not limited thereto.

Figure 6:
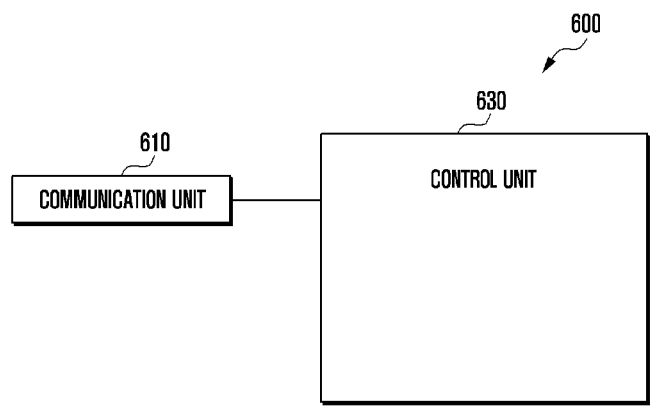
FIG. 6 is a diagram explaining a base station according to an embodiment of the present invention.

FIG. 6 is a diagram explaining a base station according to an embodiment of the present invention.

An eNB 600 may include a communication unit 610 and a control unit 630. The communication unit 610 may transmit or receive at least one signal to or from another network node. The control unit 630 may control the overall operation of the eNB 600. The control unit 630 may operate to perform the operation of the eNB 600.

As described above, it is explained that the component of the eNB 600 is divided into blocks. However, this is for convenience in explanation, and the component of the eNB 600 is not limited thereto.

Meanwhile, preferred embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments.

The invention claimed is:

1. A method for a proximity based service (ProSe) communication by a first terminal in a mobile communication system, the method comprising:
receiving a public key of at least one terminal of a ProSe group from a ProSe function node, wherein the public key belongs to a second terminal that is one of the at least one terminal of the ProSe group;
receiving, from the second terminal, a paging message including an indicator that informs the first terminal that the second terminal is initiating the ProSe communication;
receiving, from the second terminal, a ProSe communication request including a ProSe identity of the first terminal, a ProSe identity of the second terminal and an identity of the ProSe group, wherein the ProSe communication request is different from the paging message;
encrypting authentication information based on the public key to generate encrypted authentication information;
transmitting, to the second terminal, a first message including the encrypted authentication information;
receiving, from the second terminal, a second message including decrypted authentication information;
determining whether the first terminal is a target terminal for the ProSe communication request based on verifying that the decrypted authentication information included in the second message is the authentication information, and has been decrypted from the encrypted authentication information based on a private key of the second terminal;
transmitting, to the second terminal, a ProSe communication response message after it is verified that the decrypted authentication information included in the second message is the authentication information included in the first message; and
performing the ProSe communication with the second terminal.

2. The method of claim 1, wherein the authentication information includes a time stamp that is generated based on a value corresponding to a radio frame.

3. The method of claim 1, wherein
the public key of the at least one terminal of the ProSe group is registered in the ProSe function node by the second terminal.

4. A first terminal for a proximity based service (ProSe) communication in a mobile communication system, the first terminal comprising:
a transceiver; and
a controller configured to:
receive a public key of at least one terminal of a ProSe group from a ProSe function node, wherein the public key belongs to a second terminal that is one of the at least one terminal of the ProSe group;
receive, from the second terminal via the transceiver, a paging message including an indicator that informs the first terminal that the second terminal is initiating the ProSe communication;
receive, from the second terminal via the transceiver, a ProSe communication request including a ProSe identity of the first terminal, a ProSe identity of the second terminal and an identity of the ProSe group, wherein the ProSe communication request is different from the paging message;
encrypt authentication information based on the public key to generate encrypted authentication information;
transmit, to the second terminal via the transceiver, a first message including the encrypted authentication information;
receive, from the second terminal via the transceiver, a second message including decrypted authentication information;
determine whether the first terminal is a target terminal for the ProSe communication request based on verifying that the decrypted authentication information included in the second message is the authentication information, and has been decrypted from the encrypted authentication information based on a private key of the second terminal;
transmit, to the second terminal via the transceiver, a ProSe communication response message after it is verified that the decrypted authentication information included in the second message is the authentication information included in the first message; and
perform the ProSe communication with the second terminal.

5. The first terminal of claim 4, wherein the authentication information includes a time stamp that is generated based on a value corresponding to a radio frame.

6. The first terminal of claim 4, wherein
the public key of the at least one terminal of the ProSe group is registered in the ProSe function node.

7. A method for a proximity based service (ProSe) communication by a second terminal in a mobile communication system, the method comprising:
transmitting, to a first terminal, a paging message including an indicator that informs the first terminal that the second terminal is initiating the ProSe communication;
transmitting, to the first terminal, the ProSe communication request including a ProSe identity of the first terminal, a ProSe identity of the second terminal and an identity of a ProSe group, wherein the ProSe communication request is different from the paging message;
receiving, from the first terminal, a first message including encrypted authentication information, which is authentication information that has been encrypted based on a public key of the second terminal;
decrypting the encrypted authentication information based on a private key of the second terminal;
transmitting, to the first terminal, a second message including the decrypted authentication information;
receiving, from the first terminal, a ProSe communication response message after it is verified that the decrypted authentication information included in the second message is the authentication information; and
performing the ProSe communication with the first terminal.

8. The method of claim 7, wherein the authentication information includes a time stamp that is generated based on a value corresponding to a radio frame.

9. A second terminal for proximity based service (ProSe) communication in a mobile communication system, the second terminal comprising:
a transceiver; and
a controller configured to:

transmit, to a first terminal via the transceiver, a paging message including an indicator that informs the first terminal that the second terminal is initiating the ProSe communication;

transmit, to the first terminal via the transceiver, the ProSe communication request including a ProSe identity of the first terminal, a ProSe identity of the second terminal and an identity of a ProSe group, wherein the ProSe communication request is different from the paging message;

receive, from the first terminal via the transceiver, a first message including encrypted authentication information, which is authentication information that has been encrypted based on a public key of the second terminal;

decrypt the encrypted authentication information based on a private key of the second terminal;

transmit, to the first terminal via the transceiver, a second message including the decrypted authentication information;

receive, from the first terminal via the transceiver, a ProSe communication response message after it is verified that the decrypted authentication information included in the second message is the authentication information; and perform the ProSe communication with the first terminal.

10. The second terminal of claim 9, wherein the authentication information includes a time stamp that is generated based on a value corresponding to a radio frame.

* * * * *